United States Patent Office 3,125,582
Patented Mar. 17, 1964

3,125,582
PHENYLVINYLENE CYCLIC CARBONATES
Leo R. Morris, Midland, Mich., assignor to The Dow Chemical Company, Midland, Mich., a corporation of Delaware
No Drawing. Filed June 23, 1961, Ser. No. 119,036
3 Claims. (Cl. 260—340.2)

This invention relates to phenylvinylene cyclic carbonate and to certain halogen derivatives thereof, new compounds of value as fungicides. Specifically, it relates to certain new compounds having the general formula

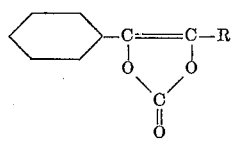

wherein R represents hydrogen, chlorine or bromine.

Both the phenylvinylene cyclic carbonate and the halogen derivatives thereof may be prepared from 4,5-dihalo-4-phenyl-1,3-dioxolan-2-one, the halogen of which may be either chlorine or bromine. The dehalogenation of this material, by reaction with zinc, gives 4-phenyl-1,3-dioxolen-2-one, while a 5-halo-4-phenyl-1,3-dioxolen-2-one results from its thermal dehydrohalogenation.

The 4,5-dihalo-4-phenyl-1,3-dioxolan-2-one starting material is obtained by the halogenation of phenylethylene cyclic carbonate in bulk as hereinafter described.

The phenylvinylene cyclic carbonate can be and is preferably prepared by the thermal dehydrohalogenation of 4-halo-4-phenyl-1,3-dioxolan-2-one which is in turn derived from the halogenation of phenylethylene cyclic carbonate at a relatively low temperature in the presence of a diluent.

The halogenation of phenylethylene cyclic carbonate to give the intermediate 4,5-dihalo-4-phenyl-1,3-dioxolan-2-one starting material is carried out by introducing the halogen into a mass of molten phenylethylene cyclic carbonate maintained at a temperature of from about 50° C. to about 70° C. Ultra-violet light is used to promote the reaction. A somewhat complex reaction mixture is obtained in which the 4,5-dihalo-4-phenyl-1,3-dioxolan-2-one predominates. This product can be isolated by fractionation under reduced pressure. Yields of the order of 60 percent of the theoretical are readily obtained.

The halogenation of phenylethylene cyclic carbonate to 4-halo-4-phenyl-1,3-dioxolan-2-one is accomplished by employing a relatively low temperature and by introducing the halogen into a solution or dispersion of the phenylethylene cyclic carbonate in an organic liquid while subjecting the reaction mixture to the action of ultra-violet light. A reaction temperature of from about 0° C. to about 20° C. is preferred. The reaction is preferably carried out at a temperature and a concentration of the phenylethylene cyclic carbonate such that at least a part of the phenylethylene cyclic carbonate is present in the solution to form a slurry. A variety of solvents may be employed, among them chloroform, benzene, carbon tetrachloride and mixtures thereof. Carbon tetrachloride is the preferred reaction solvent.

For the purposes of the present invention, the isolation of the 4-halo-4-phenyl-1,3-dioxolan-2-one is unnecessary. Heating of the reaction mixture to a relatively moderate temperature of from 40° to 100° C. is effective to bring about the dehydrohalogenation of the intermediate to give the desired phenylvinylene cyclic carbonate. This product is readily recovered from the reaction mixture by distillation thereof under reduced pressure.

The preparation of the new and novel compounds of the invention is illustrated by the following non-limiting examples.

Example 1

Into a 5 liter Pyrex flask fitted with a condenser cooled with Dry Ice, a stirrer and an inlet tube for the introduction of chlorine, there were charged 2100 ml. of carbon tetrachloride, 2100 ml. of benzene and 700 grams of powdered phenylethylene cyclic carbonate. Two General Electric 275 watt RS Reflector sun lamps were positioned above the flask so that most of the radiation therefrom was incident on the liquid in the flask. The flask was surrounded with an ice bath and the temperature of the charge was lowered to about 5° C. The charge was stirred during the lowering of the temperature. Chlorine gas was then introduced below the liquid surface of the reaction mixture at such a rate that 364 grams were added during a period of four hours. During the addition period stirring was continued and the temperature was maintained at from about 5° C. to about 10° C. At the conclusion of chlorine addition the reaction mixture was allowed to come to room temperature after which it was gradually heated with continued stirring. Vigorous evolution of hydrogen chloride occurred at a temperature of from 30° C. to 40° C. Heating was continued until the reflux temperature of the solvent mixture was reached. The solvents were then stripped from the reaction mixture under reduced pressure and the residue was distilled under vacuum. The fraction boiling at about 100°–120° C. at 1–3 mm. absolute pressure was collected. This solidified on cooling. This material, recrystallized from carbon tetrachloride, had a melting point of 80.0–81.5° C. The product, a white crystalline product, was determined to be 4-phenyl-1,3-dioxolen-2-one by the following analyses:

| | C, percent | H, percent | Mol. Wt., Cryoscopic in Benzene | Bromine Absorption, Millimols/gm. |
|---|---|---|---|---|
| Calculated | 66.67 | 3.73 | 162 | 6.17 |
| Found | 66.38 | 3.89 | 164 | 6.07 |

Example 2

To a slurry of 8.1 grams of the above obtained 4-phenyl-1,3-dioxolen-2-one in 20 ml. of carbon tetrachloride there was gradually added, with stirring, a solution of 8 grams of bromine in 20 ml. of carbon tetrachloride. The addition required 15 minutes and the temperature of the reaction mixture was maintained at less than 10° C. The solvent was removed by treatment under vacuum at room temperature. There were obtained 17 grams of an amber oil which fumed in air and which had a bromine content of 47 percent (calculated for 4,5-dibromo-4-phenyl-1,3-dioxolan-2-one 49.7).

A 12.8 gram portion of the oil obtained above was gradually heated under vacuum in a flask fitted with a 4 inch Vigreux distillation column. Vigorous gas evolution was noted at 50°–70° C. On distillation there were obtained 7.9 grams of a fraction boiling from 108° C. to 114° C. at 0.5–1.0 mm. absolute pressure. This fraction, which was solid at room temperature, was recrystallized twice from petroleum ether having a boiling point from 60° to 70° C. The product, a white crystalline solid, melted at 93°–94° C. and had a bromine content of 33.2 percent (calculated for 5-bromo-4-phenyl-1,3-dioxolen-2-one, 33.2 percent).

Example 3

Into a Pyrex flask fitted with a stirrer, thermometer and an inlet tube for the introduction of chlorine, there were charged 39.0 grams of phenylethylene cyclic carbonate. A General Electric 275 watt RS Reflector sun lamp was placed immediately below the flask. When the heat from the lamp had melted the charge, dry chlorine gas was introduced, with stirring, below the surface of the melted charge at such a rate that a weight increase of the contents of the flask of 7.9 grams was obtained during 9 hours. During this period, the temperature of the reaction mixture was maintained at 60–70° C.

The reaction mixture was then subjected to fractional distillation under vacuum through a 6 inch Vigreux column. After removal of a small amount of forerun, B.P. 60–90° C. at 0.3 mm., there were obtained 11.0 grams of a fraction (A) boiling at 94–107° C. at 0.3 mm. and 8.4 grams of a fraction (B) boiling at 110–123° C. at 0.2 mm.

Fraction A was redistilled at 101–103° C. at 0.2 mm. to give 4,5-dichloro-4-phenyl-1,3-dioxolan-2-one, a pale yellow oil having a chlorine content of 30.5 percent (calculated for 4,5-dichloro-4-phenyl-1,3-dioxolan-2-one, 30.2 percent). Heating this material to a temperature of from about 120° to about 150° C. caused the deposition of crystalline material therefrom. Evolution of hydrogen chloride also occurred during this heating. The crystalline material was recrystallized twice from petroleum ether having a boiling point of 60–70° C. The white crystalline product obtained melted at 99.0–99.5° C. and proved to be identical with the 5-chloro-4-phenyl-1,3-dioxolen-2-one obtained from fraction B, as next described.

*Example 4*

The fraction designated B obtained in the preceding example solidified on standing. It was recrystallized twice from petroleum ether having a boiling point of 60–70° C. A white, crystalline product melting at 99.0–99.5° C. was obtained. Its identity as 5-chloro-4-phenyl-1,3-dioxolen-2-one was established from the following analyses:

|  | C, percent | H, percent | Cl, percent |
|---|---|---|---|
| Calculated | 55.0 | 2.56 | 18.1 |
| Found | 55.1 | 2.60 | 18.0 |

*Example 5*

To a stirred suspension of 22 grams of powdered zinc (100 mesh) in dioxane there was added, dropwise, a solution containing 25 grams of dioxane and 20 grams of 4,5-dichloro-4-phenyl-1,3-dioxolan-2-one, prepared as described in Example 3. The addition of about one quarter of this solution during one hour caused the reaction mixture to reach a temperature of about 78° C. The remainder of the solution was added during one hour after which the reaction mixture was stirred for an additional 30 minutes. The reaction mixture was then poured with stirring into a liter of water which had been slightly acidified with hydrochloric acid. The aqueous mixture was then extracted with several portions of ether. The ether extracts were combined and the ether removed therefrom under vacuum. The residue was recrystallized twice from petroleum ether having a boiling point of from 60 to 70° C. and once from carbon tetrachloride. There were obtained 5 grams of white crystalline material, M.P. 82–83° C. A cryoscopic molecular weight determination in benzene solution gave a value of 164 (calculated for 4-phenyl-1,3-dioxolen-2-one, 162). A mixed melting point of the product with the 4-phenyl-1,3-dioxolen-2-one of Example 1 was found to be 80–82° C., indicating its identity with that material.

The compounds of the present invention are useful as microbiocides. In a representative operation, the inclusion in a nutrient culture medium of either 4-phenyl-1,3-dioxolen-2-one or of 5-chloro-4-phenyl-1,3-dioxolen-2-one in a concentration of 0.05 weight percent completely inhibited the growth therein of *Aspergillus terreus*, when the medium was inoculated with a standard culture of the said microorganism. When included in a nutrient culture medium in a concentration of 1 weight percent, 5-bromo-4-phenyl-1,3-dioxolen-2-one was effective to completely inhibit the growth of *Staphylococcus aureus* when the medium was inoculated with a standard culture thereof.

What is claimed is:

1. A phenylvinylene carbonate having the formula:

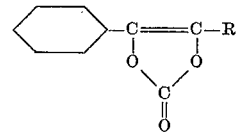

wherein R is a member of the class consisting of bromine and chlorine.

2. 5-bromo-4-phenyl-1,3-dioxolen-2-one.
3. 5-chloro-4-phenyl-1,3-dioxolen-2-one.

References Cited in the file of this patent

UNITED STATES PATENTS

| 2,773,881 | Dunn | Dec. 11, 1956 |
| 2,799,616 | Johnson | July 16, 1957 |
| 2,873,282 | McClellan | Feb. 10, 1959 |
| 2,918,478 | Newman | Dec. 22, 1959 |
| 3,020,290 | Moss | Feb. 6, 1962 |

FOREIGN PATENTS

| 1,044,104 | Germany | Nov. 20, 1958 |